United States Patent
Choi

(10) Patent No.: US 11,275,169 B2
(45) Date of Patent: Mar. 15, 2022

(54) METHOD AND APPARATUS FOR PROCESSING RADAR DATA

(71) Applicant: Samsung Electronics Co., Ltd., Suwon-si (KR)

(72) Inventor: Sung Do Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 531 days.

(21) Appl. No.: 16/220,552

(22) Filed: Dec. 14, 2018

(65) Prior Publication Data

US 2020/0072957 A1    Mar. 5, 2020

(30) Foreign Application Priority Data

Sep. 3, 2018  (KR) ................. 10-2018-0104758

(51) Int. Cl.
G01S 13/50    (2006.01)
G01S 13/42    (2006.01)
G01S 13/68    (2006.01)

(52) U.S. Cl.
CPC ......... *G01S 13/505* (2013.01); *G01S 13/426* (2013.01); *G01S 13/68* (2013.01)

(58) Field of Classification Search
CPC ....... G01S 13/505; G01S 13/426; G01S 13/68
USPC ......................................... 342/147, 56, 350
See application file for complete search history.

(56) References Cited

U.S. PATENT DOCUMENTS

| | | | |
|---|---|---|---|
| 6,703,966 B2 | 3/2004 | Corbrion et al. | |
| 7,145,497 B2 | 12/2006 | Krikorian et al. | |
| 8,810,446 B2 | 8/2014 | Shoji et al. | |
| 9,234,960 B1 | 1/2016 | McIntosh et al. | |
| 9,261,590 B1* | 2/2016 | Brown | ................... G01S 13/931 |
| 9,834,207 B2 | 12/2017 | O'Dea et al. | |
| 2018/0203108 A1* | 7/2018 | Nedjar | ................. G01S 13/904 |

FOREIGN PATENT DOCUMENTS

| | | |
|---|---|---|
| EP | 3 267 217 A1 | 1/2018 |
| JP | 2007-315957 A | 12/2007 |
| JP | 2011-122839 A | 6/2011 |
| JP | 2015-49075 A | 3/2015 |

(Continued)

OTHER PUBLICATIONS

Extended European Search Report dated Oct. 24, 2019 in corresponding European Patent Application No. 19171127.4 (10 pages in English).

*Primary Examiner* — Bo Fan
(74) *Attorney, Agent, or Firm* — NSIP Law

(57) ABSTRACT

A method for processing radar data including predicting an angle-of-interest (AOI) region based on a Doppler map generated from radar data, adjusting steering information based on the predicted AOI region, the steering information being used to identify the radar data, and determining direction-of-arrival (DOA) information corresponding to the radar data based on the adjusted steering information. A radar data processing apparatus including a radar sensor to sense radar data and a processor to predict an (AOI) region based on a Doppler map generated from the radar data, to adjust steering information, which is used to identify the radar data, based on the predicted AOI region, and to determine DOA information corresponding to the radar data based on the adjusted steering information.

22 Claims, 13 Drawing Sheets

(56) References Cited

FOREIGN PATENT DOCUMENTS

| JP | 2016-161409 A | 9/2016 |
| JP | 2017-106799 A | 6/2017 |
| KR | 10-2014-0050424 A | 4/2014 |
| KR | 10-2015-0118653 A | 10/2015 |
| KR | 10-1714198 B1 | 3/2017 |

* cited by examiner

METHOD AND APPARATUS FOR PROCESSING RADAR DATA

CROSS-REFERENCE TO RELATED APPLICATION

This application claims the benefit under 35 USC § 119(a) of Korean Patent Application No. 10-2018-0104758, filed on Sep. 3, 2018, in the Korean Intellectual Property Office, the entire disclosure of which is incorporated herein by reference for all purposes.

BACKGROUND

1. Field

The following description relates to a technology of processing radar data.

2. Description of Related Art

Advanced driver-assistance systems (ADAS) are assistance systems to enhance safety and convenience of a driver and to support driving for the purpose of avoiding a dangerous situation, using sensors installed inside or outside a vehicle.

Sensors used in an ADAS may include, for example, a camera, an infrared sensor, an ultrasonic sensor, a light detection and ranging (lidar) and a radar. Among these sensors, the radar may stably measure an object in a vicinity of a vehicle regardless of a surrounding environment such as weather, in comparison to an optical-based sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a radar data processing method includes predicting an angle-of-interest (AOI) region based on a Doppler map generated from radar data, adjusting steering information based on the predicted AOI region, the steering information being used to identify the radar data, and determining direction-of-arrival (DOA) information corresponding to the radar data based on the adjusted steering information.

The adjusting of the steering information may include adding, to the steering information, a steering vector indicating phase information calculated to be represented by radar data within the predicted AOI region.

The adjusting of the steering information may include eliminating at least a portion of steering vectors corresponding to a region other than the predicted AOI region from the steering information.

The predicting of the AOI region may include determining the AOI region based on an angle formed between a movement direction of a radar data processing apparatus including a radar sensor used to sense the radar data and a direction in which radar data reflected from a target point shown in the Doppler map is received.

The predicting of the AOI region may include determining a steering angle from a radar data processing apparatus including a radar sensor used to sense the radar data to a target point shown in the Doppler map, based on a velocity of the radar data processing apparatus and a Doppler velocity of the target point.

The determining of the steering angle may include, in response to steering angles being calculated based on the Doppler velocity of the target point and the velocity of the radar data processing apparatus, excluding one steering angle from the steering angles.

The excluding of the steering angle from the steering angles may include selecting a steering angle within a field of view (FOV) of the radar sensor based on the FOV, and excluding a steering angle outside the FOV.

The radar data processing method may further include receiving a radar signal reflected from the target point using the radar sensor to view a side with respect to a movement direction of the radar data processing apparatus.

The excluding of the steering angle from the plurality of steering angles may include excluding one steering angle from the steering angles based on phase information measured from a radar signal reflected from the target point.

The adjusting of the steering information may include adding one or more steering vectors within the AOI region to the steering information.

The adjusting of the steering information may include adding one or more steering vectors calculated based on an angular resolution designated for the AOI region to the steering information.

The predicting of the AOI region may include determining the AOI region based on a distance to a target point shown in the Doppler map and an angle formed between a movement direction of a radar data processing apparatus, which may include a radar sensor that sensed the radar data, and a direction in which a signal reflected from the target point is received.

The predicting of the AOI region may include dynamically adjusting any one or any combination of a location and a size of the AOI region and a number of AOI regions.

The adjusting of the steering information may include generating a steering vector of a dimension corresponding to a number of reception (Rx) channels of a radar sensor used to sense the radar data.

The determining of the DOA information may include searching for a steering vector matched to the sensed radar data among steering vectors included in the steering information, and determining a steering angle mapped to a found steering vector as DOA information corresponding to the radar data.

The radar data processing method may further include generating a radar scan image for a radar sensor used to sense the radar data based on the DOA information.

The radar data processing method may further include generating a surrounding map of a radar data processing apparatus based on radar scan images generated for each of a plurality of radar sensors used to sense the radar data.

The predicting of the AOI region may include generating the Doppler map for the radar sensor based on a frequency difference between a signal radiated by a radar sensor used to sense the radar data and a reflected signal.

In another general aspect, a radar data processing apparatus includes a radar sensor configured to sense radar data, and a processor configured to predict an AOI region based on a Doppler map generated from the radar data, to adjust steering information based on the predicted AOI region, and to determine DOA information corresponding to the radar data based on the steering information, the steering information being used to identify the radar data.

In another general aspect, a method performed by a radar data processing apparatus includes determining an angle-of-interest (AOI) region based on an angle formed between a movement direction of the radar data processing apparatus and a direction in which radar data reflected from a target point is received, identifying a target steering vector matched to a radar vector of the radar data from steering information and determining a steering angle corresponding to the identified target steering vector as direction-of-arrival (DOA) information, and generating a surrounding map based on the DOA information.

Generating the surrounding map may include converting information on the target point to coordinates and updating the surrounding map based on the coordinates.

Other features and aspects will be apparent from the following detailed description, the drawings, and the claims.

Figure 1:
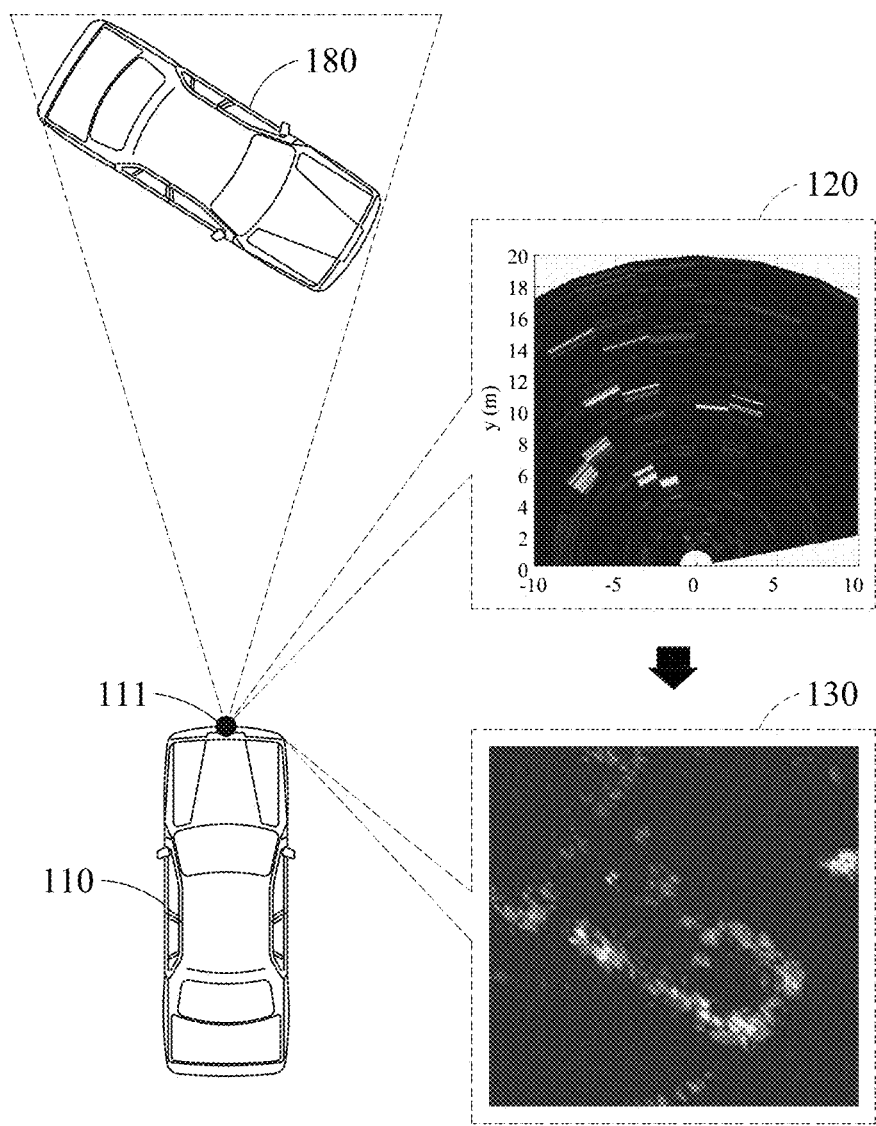
FIG. 1 illustrates an example of a recognition of a surrounding environment using a radar data processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are examples to merely describe the examples, and the scope of the examples is not limited to the descriptions provided in the present specification.

Various modifications may be made to the following examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout.

FIG. 1 illustrates an example of a recognition of a surrounding environment using a radar data processing method.

An apparatus 110 for processing radar data (hereinafter, referred to as a "radar data processing apparatus 110") detects an object 180 located in front of a vehicle, which is the radar data processing apparatus 110, using a sensor. For example, a sensor to detect an object includes, for example, an image sensor or a radar sensor, and is configured to detect a distance to the object 180.

In FIG. 1, a sensor is a radar. The radar data processing apparatus 110 analyzes a radar signal received by a radar sensor 111 and detects a distance to the object 180. The radar sensor 111 may be located inside or outside the radar data processing apparatus 110. Also, the radar data processing apparatus 110 detects the distance to the object 180 based on data collected by other sensors (for example, an image sensor) as well as the radar signal received from the radar sensor 111.

The radar data processing apparatus 110 is installed in a vehicle. The vehicle performs, for example, an adaptive cruise control (ACC) operation, an autonomous emergency braking (AEB) operation, and a blind spot detection (BSD) operation based on a distance to an object detected by the radar data processing apparatus 110.

Also, the radar data processing apparatus 110 generates a surrounding map 130, as well as detects a distance. The surrounding map 130 is a map that shows locations of targets present in the vicinity of the radar data processing apparatus 110. For example, a target around the radar data processing apparatus 110 may be a dynamic object, such as, a vehicle or a person, or a static object (background), such as a guardrail or a traffic light.

To generate the surrounding map 130, a single scan image method is used. The single scan image method is a method of acquiring a single scan image 120 from a sensor and generating the surrounding map 130 from the acquired scan image 120 using the radar data processing apparatus 110. The single scan image 120 is an image generated from a radar signal sensed by a single radar sensor 111, and has a relatively low resolution. The single scan image 120 is a radar scan image, and represents distances indicated by radar signals received at an arbitrary elevation angle by the radar sensor 111. For example, in the single scan image 120 of FIG. 1, a horizontal axis represents a steering angle of the radar sensor 111 and a vertical axis represents a distance from the radar sensor 111 to a target. However, a form of the single scan image is not limited to that of FIG. 1, and the single scan image may be expressed in a different format depending on a design.

In the following description, a steering angle is an angle corresponding to a direction from a radar data processing apparatus to a target point. For example, the steering angle may be an angle between a movement direction of the radar data processing apparatus (for example, a vehicle) and a target point based on the radar data processing apparatus.

The radar data processing apparatus 110 acquires accurate information about a shape of a target based on a multi-radar map. The multi-radar map is generated from a combination of a plurality of radar scan images. For example, the radar data processing apparatus 110 generates the surrounding map 130 by spatially and temporally combining radar scan images acquired by a movement of the radar sensor 111.

Radar data includes row data sensed by the radar sensor 111.

To generate the surrounding map 130, direction-of-arrival (DOA) information is utilized. The DOA information is information indicating a direction in which a radar signal reflected from a target point is received. The DOA information is used to generate radar scan data and a surrounding map. To acquire high-resolution DOA information, the radar data processing apparatus 110 needs to receive radar signals for a larger number of angles and/or distances and process a phase. When a larger number of signals is received and a phase is processed in the radar sensor 111, a number of operations and a time for the operations increase. Hereinafter, an example of acquiring high-resolution DOA information based on a relatively low operation load will be described.

Figure 2:
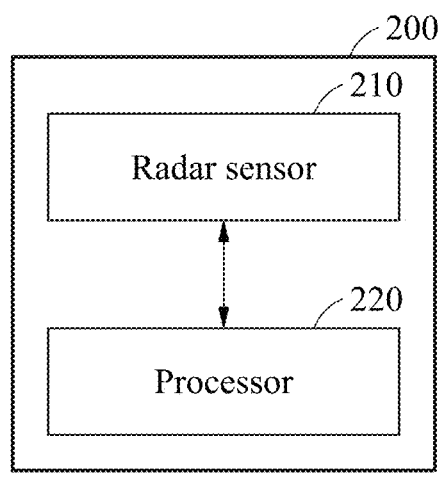
FIG. 2 illustrates an example of a configuration of a radar data processing apparatus.

FIG. 2 illustrates an example of a configuration of a radar data processing apparatus 200.

Referring to FIG. 2, the radar data processing apparatus 200 includes a radar sensor 210 and a processor 220.

The radar sensor 210 senses radar data. For example, the radar sensor 210 externally radiates a radar signal and receives a signal corresponding to the radiated radar signal reflected from a target point. For example, the radar sensor 210 includes an antenna corresponding to a plurality of reception (Rx) channels and signals received through the Rx channels have different phases based on directions in which the signals are received. An example of the radar sensor 210 will be further described below with reference to FIG. 3.

The processor 220 generates a Doppler map based on a signal received by the radar sensor 210 and reflected from a target point. The Doppler map is a map indicating Doppler information of target points sensed by the radar sensor 210. A horizontal axis of the Doppler map represents a Doppler value and a vertical axis of the Doppler map represents a distance to a target point. The Doppler value is, for example, a Doppler velocity that is a relative velocity (for example, a difference between a velocity of the target point and a velocity of the radar sensor 210) of a target point with respect to the radar sensor 210.

An example of a Doppler map will be described below with reference to FIG. 9b. For example, the processor 220 generates a Doppler map based on a frequency difference between a signal radiated by the radar sensor 210 and a reflected signal. However, a shape of a Doppler map is not limited thereto, and may vary depending on a design.

The processor 220 predicts an angle-of-interest region (hereinafter, referred to as an "AOI region") based on a Doppler map generated from radar data. The AOI region is a region corresponding to an angle of an object for which an inanimate object or a background is expected to exist. For example, the AOI region is represented by an arbitrary angle range. For example, when an object is expected to exist in a right direction at 30 degrees with respect to a movement direction of the radar data processing apparatus 200, the AOI region is set to be in an angle range of 28 degrees to 32 degrees. However, the AOI region is not limited thereto and may vary depending on a design.

The processor 220 adjusts steering information based on the predicted AOI region. The steering information is used to identify radar data. For example, the steering information may be adjusted by adding a new steering vector to the original steering information, or by removing an existing steering vector. The processor 220 adjusts the steering information to include steering vectors concentrated in the AOI region, and updates the steering information to focus on the AOI region.

In the following description, steering information is information used to identify radar data and includes, for example, a set of steering vectors. Steering vectors included in the steering information may be referred to as "candidate steering vectors." For example, when arbitrary radar data is assumed to be received at a predetermined angle, a steering vector includes phase information calculated to be included in the radar data. When a vector including phase information of sensed radar data is a radar vector, a steering vector determined to be matched to the radar vector among candidate steering vectors included in steering information is referred to as a "target steering vector."

Phase information of radar data indicates a phase difference between a reference phase and a phase of a signal received through each of a plurality of Rx channels included in the radar sensor 210. The reference phase may be an arbitrary phase, or may be set as a phase of one of the plurality of Rx channels. For example, the processor 220 generates a radar vector of a dimension corresponding to a number of Rx channels of the radar sensor 210 based on radar data. For example, when a radar sensor includes four Rx channels, the processor 220 generates a four-dimensional radar vector including a phase value corresponding to each Rx channel. A phase value corresponding to each Rx channel is a numerical value representing the above-described phase difference.

An example in which the radar sensor 210 includes one transmission (Tx) channel and four Rx channels is described below. A radar signal radiated through the TX channel is reflected from a target point, and radar signals received through the four RX channels are received at different angles for each channel. The radar sensor 210 generates a radar vector including phase values for each of the four RX channels from radar data. The processor 220 identifies a target steering vector having the most similar phase value to phase information of the radar vector among a plurality of candidate steering vectors, and determines an Rx direction indicated by the identified target steering vector as DOA information.

The processor 220 determines a direction of a sensed target point with respect to the radar data processing apparatus 200 based on steering information, as described above.

Figure 3:
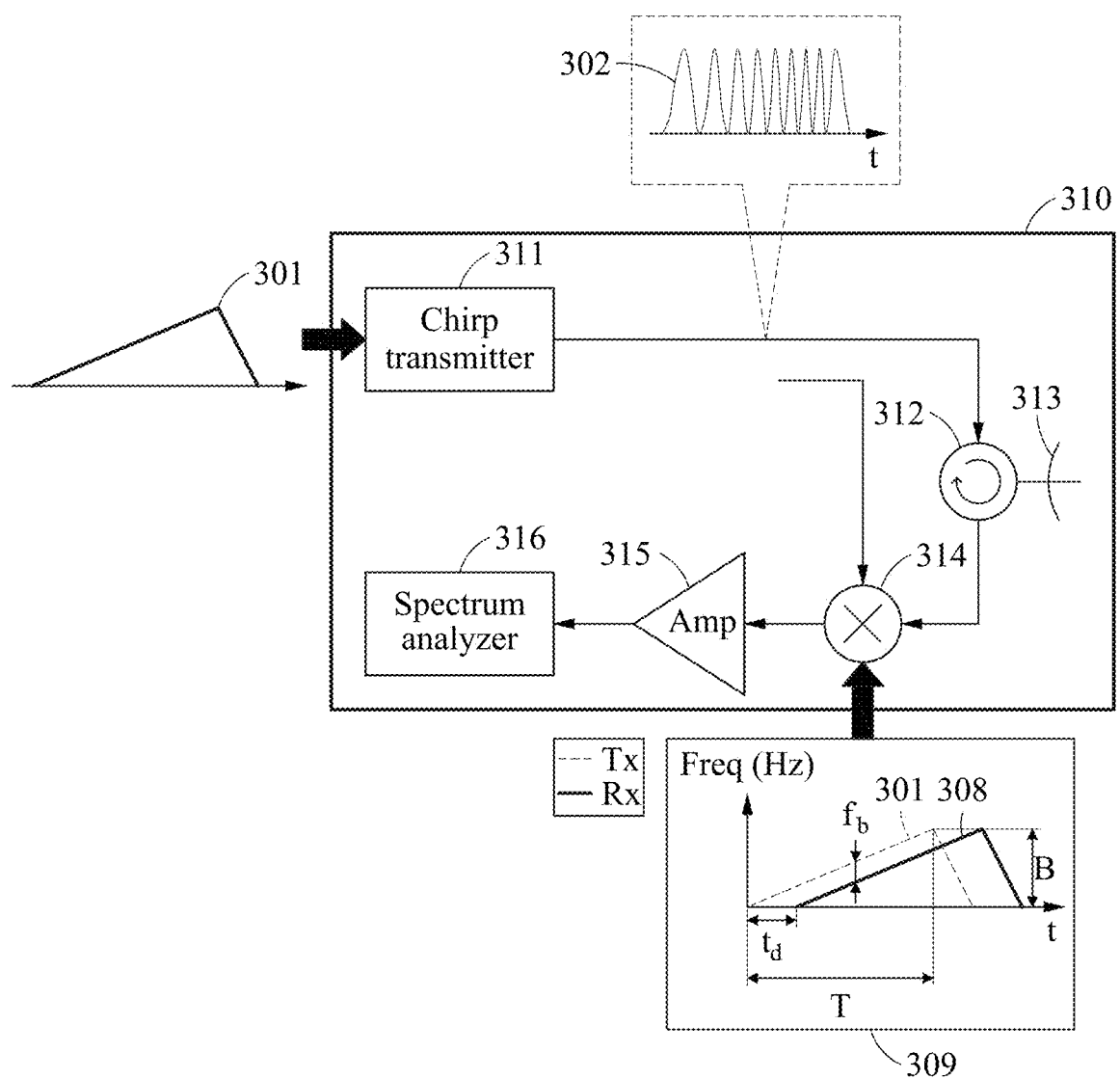
FIG. 3 illustrates an example of a configuration of a radar sensor.

FIG. 3 illustrates an example of a configuration of a radar sensor 310.

The radar sensor 310 radiates a signal through an antenna 313 and receives a signal through the antenna 313. The radar sensor 310 is, for example, an millimeter wave (mmWave) radar, and is configured to measure a distance to an object by analyzing a change in a signal waveform and a time of flight (TOF) that a radiated electric wave returns after hitting an object. The radar sensor 310 is implemented as, for example, a frequency-modulated continuous-wave radio detection and ranging (FMCW radar).

A chirp transmitter 311 generates a frequency modulated (FM) signal 302 by modulating a frequency of a chirp signal 301. The chirp signal 301 is a signal having an amplitude linearly increasing or decreasing over time. For example, the chirp transmitter 311 generates the FM signal 302 with a frequency corresponding to an amplitude of the chirp signal 301. For example, as shown in FIG. 3, the FM signal 302 has a waveform of a gradually increasing frequency in an interval in which the amplitude of the chirp signal 301 increases, and has a waveform of a gradually decreasing frequency in an interval in which the amplitude of the chirp signal 301 decreases. The chirp transmitter 311 transfers the FM signal 302 to a duplexer 312 of the radar sensor 310.

The duplexer 312 determines a transmission path and a reception path of a signal through the antenna 313. For example, while the radar sensor 310 is radiating the FM signal 302, the duplexer 312 forms a signal path from the chirp transmitter 311 to the antenna 313, transfers the FM signal 302 to the antenna 313 through the formed signal path, and externally radiates the FM signal 302.

When the radar sensor 310 currently receives a signal reflected from an object, the duplexer 312 forms a signal path from the antenna 313 to a spectrum analyzer 316. The antenna 313 receives a signal that is reflected and returned after a radiated signal arrives at an obstacle, and the radar sensor 310 transfers the reflected signal through the signal path from the antenna 313 to the spectrum analyzer 316.

A frequency mixer 314 demodulates the received signal to a linear signal (for example, an original chirp signal) before a frequency modulation. An amplifier 315 amplifies an amplitude of the demodulated linear signal.

The spectrum analyzer 316 compares the radiated chirp signal 301 to a signal 308 that is reflected from an object and that is returned. The spectrum analyzer 316 detects a frequency difference between the radiated chirp signal 301 and the reflected signal 308. The frequency difference between the radiated chirp signal 301 and the reflected signal 308 indicates a constant difference during an interval in which an amplitude of the radiated chirp signal 301 linearly increases along a time axis of a graph 309 of FIG. 3, and is proportional to a distance between the radar sensor 310 and the object. Thus, the distance between the radar sensor 310 and the object is derived from the frequency difference between the radiated chirp signal 301 and the reflected signal 308. The spectrum analyzer 316 transmits analyzed information to a processor of a radar data processing apparatus.

For example, the spectrum analyzer 316 calculates the distance between the radar sensor 310 and the object using Equation 1 shown below.

$$R = \frac{cTf_b}{2B} \qquad \text{Equation 1}$$

In Equation 1, R denotes the distance between the radar sensor 310 and the object, and c denotes a velocity of light. Also, T denotes a duration of an interval in which the radiated chirp signal 301 increases. $f_b$ denotes the frequency difference between the radiated chirp signal 301 and the reflected signal 308 at an arbitrary point in time within an increase interval, and is referred to as a "beat frequency." B denotes a modulated bandwidth. For example, the beat frequency $f_b$ is derived using Equation 2 shown below.

$$f_b = \frac{t_d B}{T} \qquad \text{Equation 2}$$

In Equation 2, $f_b$ denotes the beat frequency, and $t_d$ denotes a time difference (for example, a delay time) between a point in time at which the chirp signal 301 is radiated and a point in time at which the reflected signal 308 is received.

For example, a plurality of radar sensors is installed at different locations of a vehicle, and the radar data processing apparatus calculates relative velocities, directions, and distances to target points with respect to all directions of the vehicle, based on information sensed by the plurality of radar sensors. The radar data processing apparatus is installed in the vehicle. The vehicle provides various functions, for example, an ACC, a BSD, and a lane change assistance (LCA), which are helpful for driving, based on information obtained based on information collected by the radar sensors.

Each of the plurality of radar sensors externally radiates a chirp signal after frequency modulation, and receives a signal reflected from a target point. The processor of the radar data processing apparatus determines a distance from each of the plurality of radar sensors to a target point from a frequency difference between the radiated chirp signal and the received signal.

Figure 4:
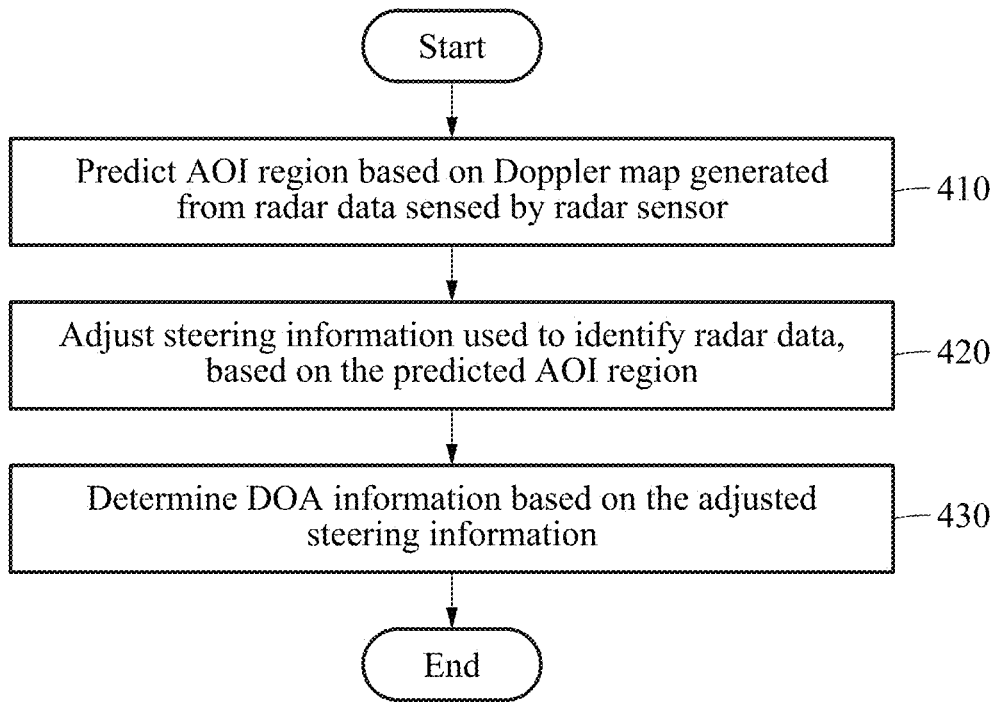
FIG. 4 is a flowchart illustrating an example of a radar data processing method.

FIG. 4 is a flowchart illustrating an example of a radar data processing method.

Referring to FIG. 4, in operation 410, a radar data processing apparatus generates a Doppler map from sensed radar data, and predicts an AOI region based on the generated Doppler map. An example of predicting an AOI region will be further described below with reference to FIG. 9c.

In operation 420, the radar data processing apparatus adjusts, based on the predicted AOI region, steering information used to identify the radar data. An example of adjusting steering information will be further described below with reference to FIGS. 11 and 12.

In operation 430, the radar data processing apparatus determines DOA information based on the adjusted steering information.

The steering information is, for example, a set of a plurality of candidate steering vectors that are set and stored in advance, and eigenvalues are one-to-one mapped to the candidate steering vectors. For example, when the plurality of stored candidate steering vectors have phase information and when an eigenvalue mapped to each of the candidate steering vectors is a steering angle, the radar data processing apparatus determines a target steering vector corresponding to a radar vector of received radar data among the plurality of stored candidate steering vectors. The radar data processing apparatus outputs a steering angle mapped to the determined target steering vector.

An operation of determining the target steering vector includes, for example, determining, as a target steering vector, a steering vector (for example, a steering vector with a smallest Euclidean distance from the radar vector) with a smallest difference from the radar vector among the plurality of stored candidate steering vectors. Also, the operation of determining the target steering vector includes determining, as a target steering vector, a candidate steering vector having a most similar parameter to a predetermined parameter among several parameters of the radar vector. In addition, the operation of determining the target steering vector is implemented using various schemes.

The radar data processing apparatus determines a steering angle mapped to the determined target steering vector as DOA information corresponding to the radar data.

When a number of candidate steering vectors included in the steering information increases, a steering angle indicated by a candidate steering vector is subdivided. Thus, the radar data processing apparatus determines, as the DOA information, a value of a relatively high angular resolution.

Figure 5:
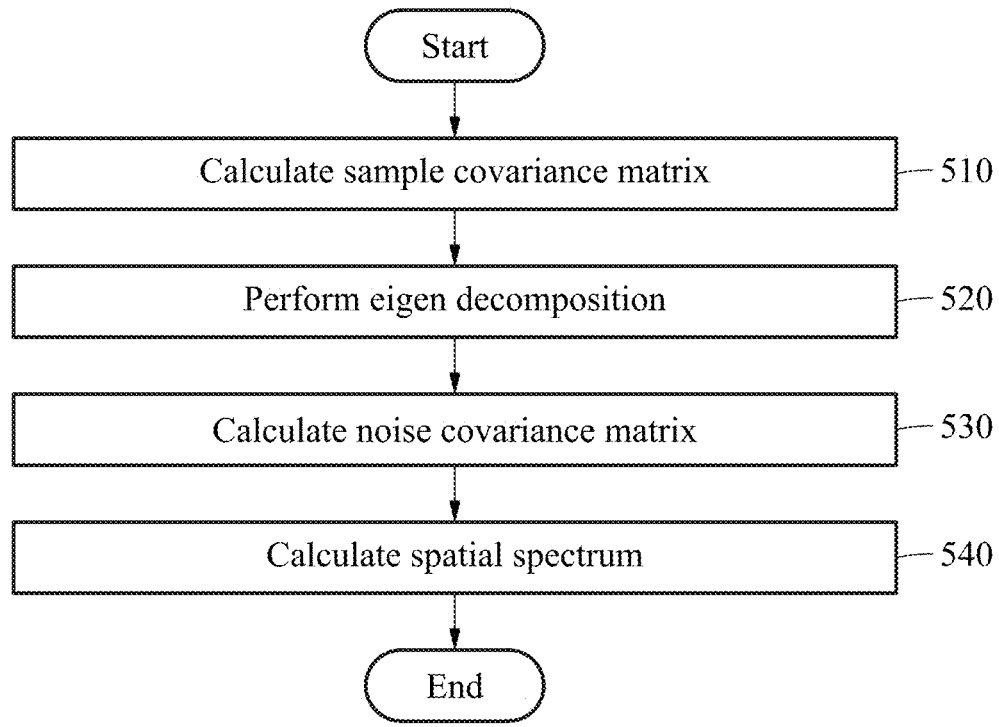
FIG. 5 is a flowchart illustrating an example of processing direction-of-arrival (DOA) information.

FIG. 5 is a flowchart illustrating an example of processing DOA information.

A radar data processing apparatus processes DOA information by applying a multiple signal classification (MUSIC) algorithm to radar data.

Referring to FIG. 5, in operation 510, the radar data processing apparatus calculates a sample covariance matrix. For example, the radar data processing apparatus calculates the sample covariance matrix based on a result obtained by sampling a radar signal received by an individual Rx channel of a radar sensor.

In operation 520, the radar data processing apparatus performs an eigen decomposition. For example, the radar data processing apparatus calculates eigenvalues and eigenvectors by performing an eigen decomposition of the above-described sample covariance matrix.

In operation 530, the radar data processing apparatus calculates a noise covariance matrix. For example, the radar data processing apparatus divides the sample covariance matrix into a signal component and a noise component.

In operation 540, the radar data processing apparatus calculates a spatial spectrum. The radar data processing apparatus forms the spatial spectrum based on the noise covariance matrix, and acquires DOA information by searching for a peak.

For example, a resolution of a surrounding map is proportional to an algorithm processing time for acquisition of the DOA information. When a resolution increases, an amount of time used to calculate DOA information in operation 540 increases.

However, the above-described MUSIC algorithm is merely an example, and other algorithms may also be applied to radar data depending on a design. For example, conventional digital beamforming (CDBF), Bartlett, or minimum variance distortionless response (MVDR) may be used.

Figure 6:
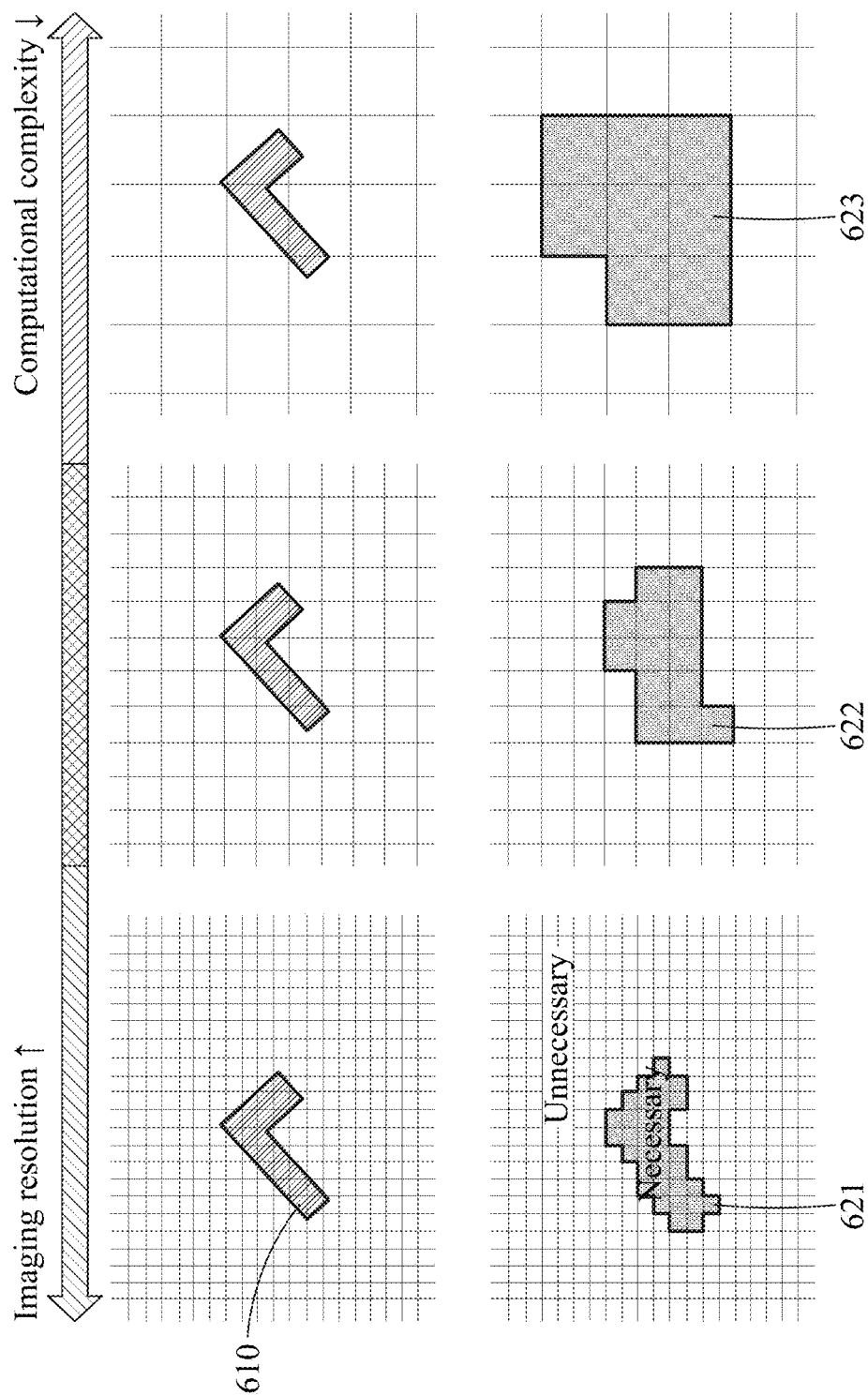
FIG. 6 illustrates an example of a resolution in processing of DOA information.

FIG. 6 illustrates an example of a resolution in processing of DOA information.

FIG. 6 illustrates a sensing result based on steering information for different resolutions of an object 610. An individual space of a grid pattern of FIG. 6 corresponds to a candidate steering vector included in steering information. When a number of steering vectors included in steering information increases, a degree of precision of identification of a direction in which a signal is received by a radar data processing apparatus increases. Thus, a sensing result of a higher resolution is acquired.

A left portion of FIG. 6 illustrates target points 621 sensed based on steering information with a relatively high resolution. A middle portion of FIG. 6 illustrates target points 622 sensed based on steering information with a medium resolution. A right portion of FIG. 6 illustrates target points 623 sensed based on steering information with a relatively low resolution. In an example, when a resolution of steering information increases, a density increases, that is, a number of candidate steering vectors included in the steering information increases, which leads to acquisition of an accurate image. However, a computational complexity increases. In another example, when the resolution of the steering information decreases, the density decreases, that is, the number of candidate steering vectors in the steering information decreases, which leads to acquisition of an inaccurate image. However, the computational complexity decreases.

A radar data processing apparatus performs a method of detecting an object 610 from an important region, with a reduced computational complexity and a relatively high resolution. Hereinafter, an example of an operation of the radar data processing apparatus to acquire an image having an increased resolution, with a relatively low computational complexity, based on steering information including candidate steering vectors focused on an AOI region in which the object 610 is expected to exist, will be described with reference to FIGS. 7 through 12.

Figure 7:
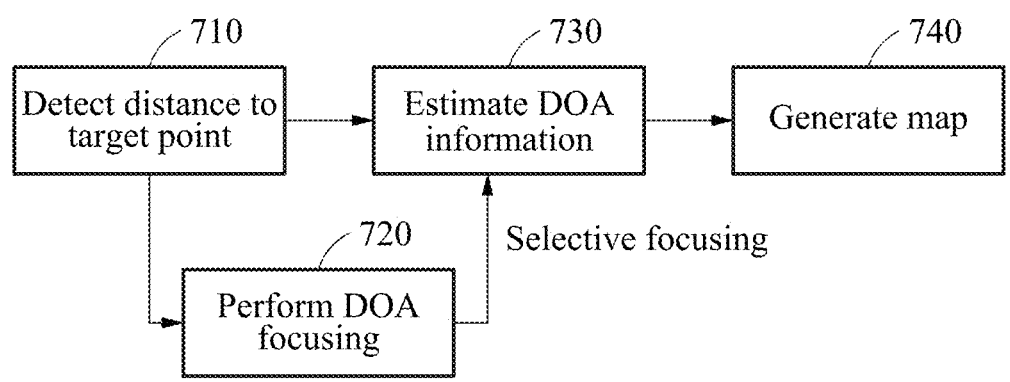
FIGS. 7 and 8 illustrate an example of a process of processing radar data.
Figure 8:
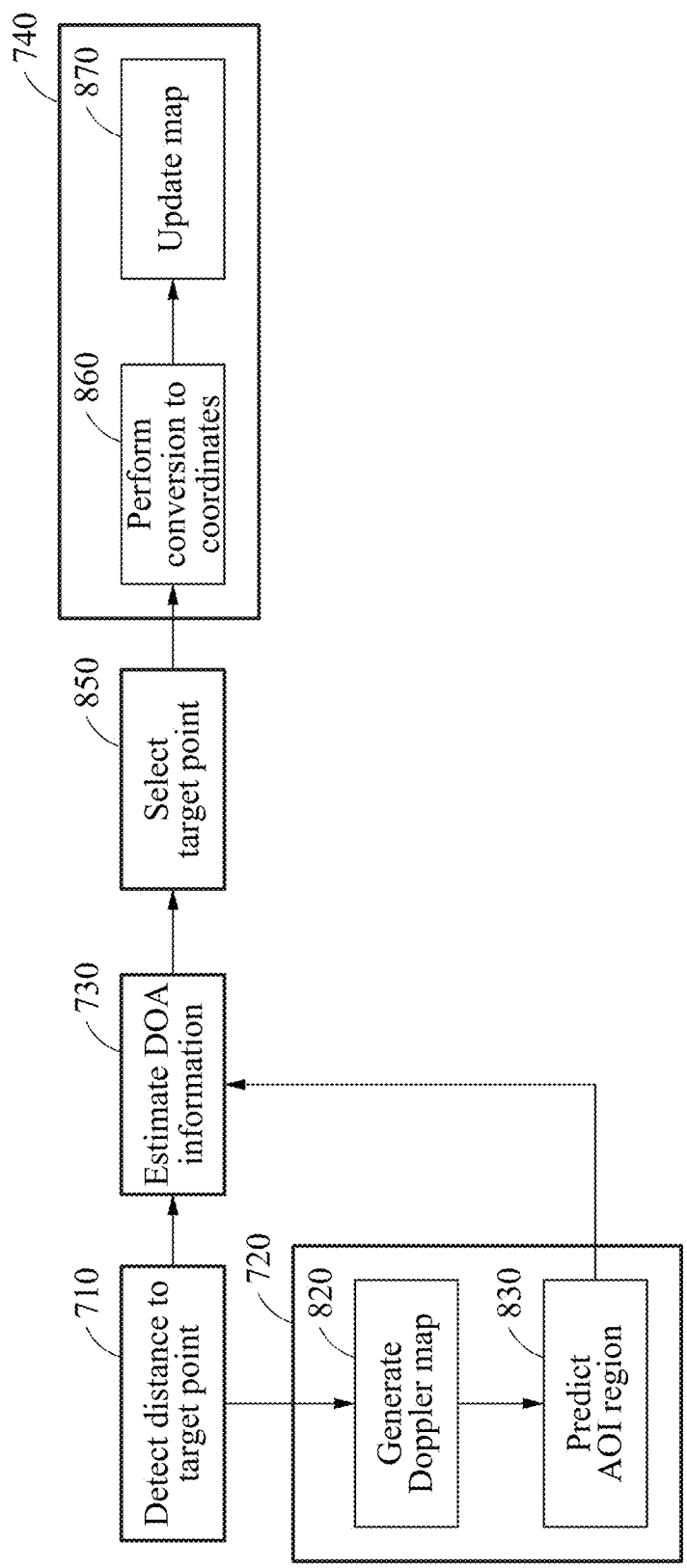

FIGS. 7 and 8 illustrate an example of a process of processing radar data.

Referring to FIG. 7, in operation 710, a radar data processing apparatus detects a distance to a target point. For example, the radar data processing apparatus processes a radar signal, and identifies a distance to a target point from which the radar signal is reflected.

In operation 720, the radar data processing apparatus performs a DOA focusing. The radar data processing apparatus locally increases a resolution of a radar sensor by focusing on a predicted AOI region. The radar data processing apparatus adds a candidate steering vector corresponding to an AOI region to steering information. For example, in operation 820, the radar data processing apparatus generates a Doppler map. The radar data processing apparatus generates a Doppler map based on a frequency difference between a radiated signal and a reflected signal. The radar data processing apparatus determines distances to target points and Doppler velocities of the target points from radar data, to generate a Doppler map. In operation 830, the radar data processing apparatus predicts an AOI region. For example, the radar data processing apparatus determines an AOI region based on an angle formed between a movement direction of the radar data processing apparatus with a radar sensor and a direction in which radar data reflected from a target point shown in the Doppler map is received.

For example, the radar data processing apparatus adds a candidate steering vector corresponding to an optimal AOI region to steering information every time frame, to efficiently acquire DOA information, which will be further described below.

In operation 730, the radar data processing apparatus estimates DOA information. For example, the radar data processing apparatus identifies radar data of each target point based on adjusted steering information. The radar data processing apparatus identifies a target steering vector matched to radar data from steering information including a candidate steering vector focused on an AOI region. The radar data processing apparatus determines a steering angle corresponding to the identified target steering vector as DOA information for the radar data. For example, the radar data processing apparatus estimates DOA information using an MUSIC algorithm, an MVDR algorithm, or estimation of signal parameters via rotational invariance technique (ES-PRIT). The radar data processing apparatus identifies a target steering vector matched to a radar vector of sensed radar data from steering information and determines a steering angle corresponding to the identified target steering vector as DOA information.

In operation 740, the radar data processing apparatus generates a map. For example, the radar data processing apparatus generates a surrounding map based on DOA information determined for radar data. For example, in operation 860, the radar data processing apparatus converts acquired information on a target point (for example, a distance to a target point, or DOA information for the target point) to coordinates. The radar data processing apparatus uses, for example, a constant false alarm rate (CFAR) detection scheme, or a Max-Op. In operation 870, the radar data processing apparatus updates a surrounding map based on the coordinates. For example, the radar data processing apparatus generates a radar scan image for the radar sensor based on DOA information. The radar data processing apparatus generates a surrounding map of the radar data processing apparatus based on radar scan images generated for each of a plurality of radar sensors.

Also, although not shown in FIG. 7, the radar data processing apparatus selects a target point in operation 850, as shown in FIG. 8. The radar data processing apparatus selects a target point to be applied to a generation of a map among target points from which the DOA information is estimated in operation 730. In an example, the radar data processing apparatus selects a target point within a field of view (FOV) of the radar sensor. The radar data processing apparatus excludes a target point outside the FOV from operation 740. In another example, when a similarity between DOA information of two target points is greater than or equal to a threshold similarity, the radar data processing apparatus selects one of the two target points and excludes the other, because when the DOA information of the two target points is identical or very similar to each other, the two target points are substantially the same point. Thus, due to a generation of a map based on the same target point, an operation load of the radar data processing apparatus increases, but a resolution is not increased.

Hereinafter, an example of determining the AOI region of operation 830 will be described with reference to FIGS. 9a through 9c.

Figure 9A:
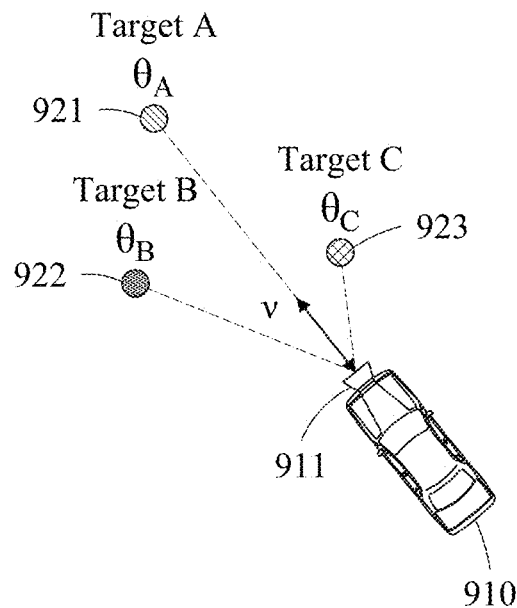
FIGS. 9a, 9b, and 9c illustrate an example of a Doppler map and an example of dynamically adjusting steering information corresponding to the Doppler map.
Figure 9B:
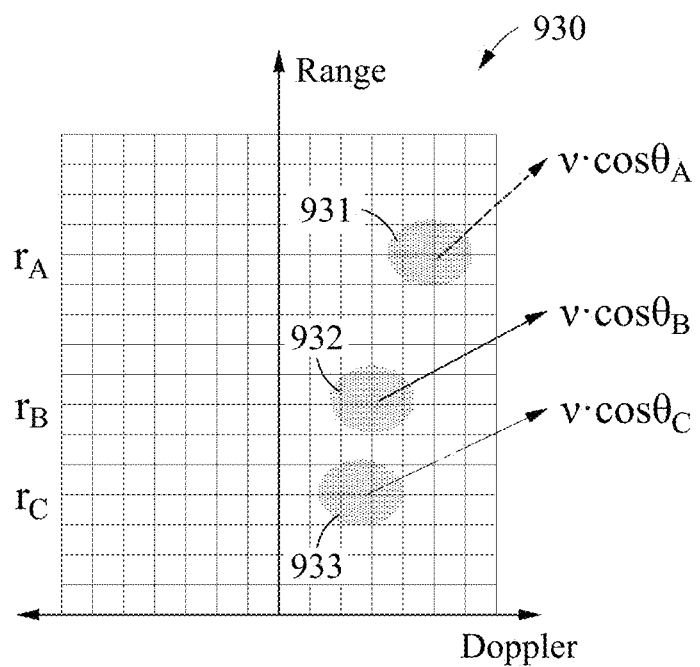
Figure 9C:
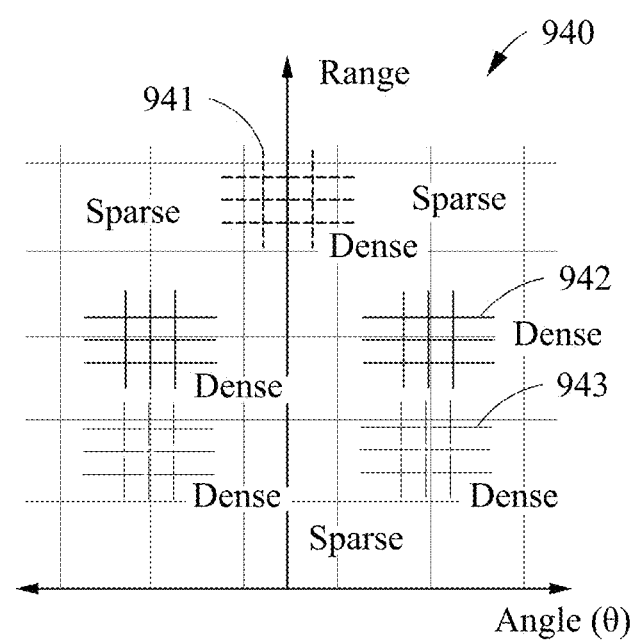

FIGS. 9a through 9c illustrate an example of a Doppler map and an example of dynamically adjusting steering information corresponding to the Doppler map.

A radar data processing apparatus 910 determines an AOI region based on an angle formed between a movement direction of the radar data processing apparatus 910 and a direction in which radar data is received. The received radar data is data corresponding to a signal reflected from a target point shown in a Doppler map 930.

The Doppler map 930 is a map representing Doppler information of target points sensed by a radar sensor 911, and shows a Doppler value and a relative location of each target point based on a traveling direction of a vehicle. In the Doppler map 930, a horizontal axis represents a Doppler value, and a vertical axis represents a distance (range) to a target point. The Doppler value is, for example, a Doppler velocity, and is a relative velocity to a target point based on the radar sensor 911.

For example, FIG. 9a illustrates a situation in which a target A 921, a target B 922 and a target C 923 are present around the radar data processing apparatus 910. The target A 921 is located at $\Theta_A$ based on the movement direction of the radar data processing apparatus 910, the target B 922 is located at $\Theta_B$ based on the movement direction of the radar data processing apparatus 910, and the target C 923 is located at $\Theta_C$ based on the movement direction of the radar data processing apparatus 910.

FIG. 9b illustrates the Doppler map 930 generated based on radar data collected by the radar sensor 911 in the situation of FIG. 9a.

When results obtained as described above are mapped to the Doppler map 930, the target A 921 has a Doppler velocity $v_A$ and is present at a point 931 corresponding to a range $r_A$. The target B 922 has a Doppler velocity $v_B$ and is present at a point 932 corresponding to a range $r_B$. The target C 923 has a Doppler velocity $v_C$ and is present at a point 933 corresponding to a range $r_C$.

The radar data processing apparatus 910 determines a steering angle for a target point from the Doppler map 930. A steering angle for a target point detected from the Doppler map 930 is referred to as a "steering angle of interest." A relationship among the movement velocity of the radar data processing apparatus 910, a Doppler velocity of an individual target and a steering angle of interest is represented as shown in Equation 3 below.

$$v_d = v \cdot \cos \Theta \qquad \text{Equation 3}$$

In Equation 3, $v_d$ denotes a Doppler velocity of a target, $\Theta$ denotes a steering angle of interest, and $v$ denotes a velocity of a movement of the radar data processing apparatus 910 (for example, a vehicle). Thus, the radar data processing apparatus 910 determines a steering angle $\Theta$ of interest from the radar data processing apparatus 910 to a target point shown in the Doppler map 930, based on a velocity of the radar data processing apparatus 910 and a Doppler velocity of the target point. For example, the steering angle $\Theta$ of interest is calculated using Equation 4 shown below.

$$\Theta = \pm |\cos^{-1}(v_d/v)| \qquad \text{Equation 4}$$

Based on Equation 4, the radar data processing apparatus 910 calculates the steering angle $\Theta$ of interest based on the Doppler velocity $v_d$ of the target and the velocity $v$ of the movement of the radar data processing apparatus 910.

The radar data processing apparatus 910 determines an AOI region of FIG. 9c based on a distance to a target point shown in the Doppler map 930 and an angle formed between the movement direction of the radar data processing apparatus 910 and a direction in which a signal reflected from the target point is received.

FIG. 9c illustrates an arrangement 940 based on ranges and steering angles of candidate steering vectors included in steering information. For example, FIG. 9c illustrates examples of AOI regions 941, 942 and 943 predicted based on the Doppler map 930 of FIG. 9b. A size of $\Theta$ calculated from the Doppler map 930 is derived, but a sign (for example, + or −) is not limited, and accordingly the radar data processing apparatus 910 sets the AOI regions 941, 942 and 943 to be symmetrical to each other based on a range axis as shown in FIG. 9c.

A point at which two straight lines of a grid of FIG. 9c intersect indicates that a candidate steering vector is located at an angle of the point. The radar data processing apparatus 910 determines the AOI regions 941, 942 and 943 based on the range and the steering angle of interest calculated for a target point from the steering information using Equation 4 as described above.

Because the target A 921 of FIG. 9a is located on a central portion of the movement direction of the radar data processing apparatus 910, a Doppler velocity $v_d$ of the target A 921 is equal to the velocity v of the movement of the radar data processing apparatus 910. Thus, a steering angle $\Theta_A$ of interest for the target A 921 may be "0." As shown in FIG. 9c, the radar data processing apparatus 910 forms the AOI region 941 corresponding to the target A 921 based on the steering angle $\Theta_A$ of interest. The radar data processing apparatus 910 adds, to steering information, a candidate steering vector mapped to a steering angle within the AOI region 941.

Because the targets B 922 and C 923 deviate from the movement direction of the radar data processing apparatus 910, Doppler velocities $v_d$ of the targets B 922 and C 923 are different from the velocity v of the movement of the radar data processing apparatus 910. Thus, the radar data processing apparatus 910 acquires positive steering angles $\Theta_B$ and $\Theta_C$ of interest and negative steering angles $\Theta_B$ and $\Theta_C$ of interest for the targets B 922 and C 923 based on the movement direction of the radar data processing apparatus 910. In FIG. 9c, the radar data processing apparatus 910 determines an AOI region corresponding to each of two steering angles of interest. For the target B 922, the radar data processing apparatus 910 determines AOI regions 942 corresponding to both the positive steering angle $\Theta_B$ of interest and the negative steering angle $\Theta_B$ of interest. Also, for the target C 923, the radar data processing apparatus 910 determines AOI regions 943 corresponding to both the positive steering angle $\Theta_C$ of interest and the negative steering angle $\Theta_C$ of interest.

For example, a target point shown in the Doppler map 930 by the radar data processing apparatus 910 is assumed to be a static background. In an example, when a target point is actually a static background, the detected target point may be used to update a radar map. In another example, when a target point is a dynamic object instead of a static background, the dynamic object is naturally excluded from updating of a radar map because the dynamic object deviates from an AOI region based on a movement of the radar data processing apparatus 910. Thus, in FIG. 9b, a Doppler velocity of an individual target is regarded as a relative velocity at which the radar data processing apparatus 910 approaches a stationary target.

Figure 10A:
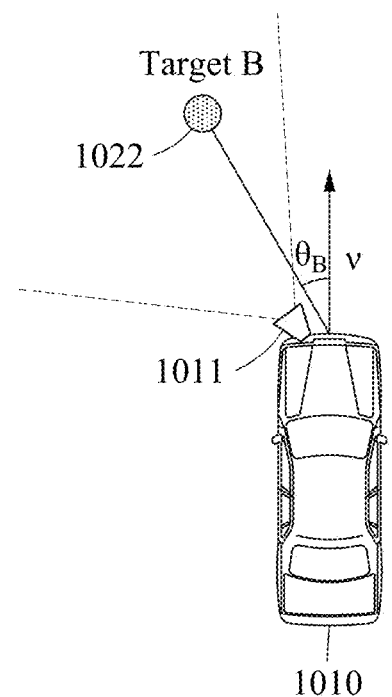
FIGS. 10a, 10b, and 10c illustrate an example of determining an angle-of-interest (AOI) region.
Figure 10B:
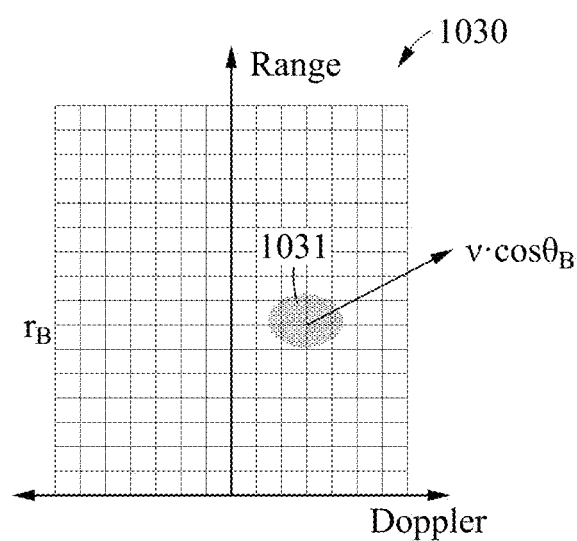
Figure 10C:
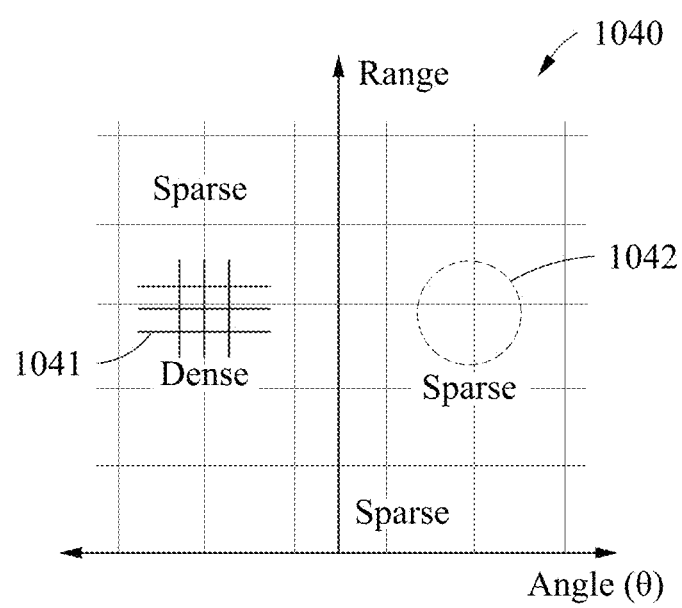

FIGS. 10a through 10c illustrate an example of determining an AOI region.

In an example, in response to a plurality of steering angles of interest being calculated based on a Doppler velocity and a velocity of a radar data processing apparatus 1010, the radar data processing apparatus 1010 excludes a portion of the plurality of steering angles of interest. For example, the radar data processing apparatus 1010 excludes a steering angle of interest outside an FOV of a radar sensor 1011 based on the FOV, and selects a steering angle of interest within the FOV. The radar data processing apparatus 1010 determines an AOI region based on the selected steering angle of interest.

FIG. 10a illustrates an example in which the radar sensor 1011 is located obliquely to a longitudinal axis of a vehicle.

In FIG. 10a, the radar sensor 1011 is installed on one side (for example, a left side) of the radar data processing apparatus 1010 with respect to a movement direction of the radar data processing apparatus 1010 to view the side. The radar data processing apparatus 1010 receives, using the radar sensor 1011, a radar signal reflected from a target point.

In FIG. 10b, the radar data processing apparatus 1010 generates a Doppler map 1030, similarly to that of FIG. 9b. The generated Doppler map 1030 includes a point 1031 corresponding to a target B 1022. The radar data processing apparatus 1010 determines a steering angle $\Theta_B$ of interest based on a Doppler velocity of the target B 1022 and a velocity of a movement of the radar data processing apparatus 1010. Based on Equation 4 described above, the steering angle $\Theta_B$ of interest for the target B 1022 is represented by a positive value and a negative value. However, it is impossible to observe a positive steering angle of interest (for example, a right side of the radar data processing apparatus 1010 of FIG. 10a) using the radar sensor 1011 located as shown in FIG. 10a. Thus, the radar data processing apparatus 1010 determines a negative value as the steering angle $\Theta_B$ of interest for the target B 1022.

FIG. 10c illustrates an arrangement 1040 based on ranges and steering angles of candidate steering vectors included in steering information. For example, FIG. 10c illustrates an AOI region determined based on the above-described steering angle $\Theta_B$ of interest. Similar to FIG. 9c, in FIG. 10c, candidate AOI regions 1041 and 1042 are determined, and the radar data processing apparatus 1010 excludes the AOI region 1042 on the right side because the radar sensor 1011 is installed on the left side.

The radar data processing apparatus 1010 adds a candidate steering vector to a single AOI region, that is, the AOI region 1041 determined for the target B 1022 in the steering information. The radar data processing apparatus 1010 excludes an addition of a candidate steering vector for the AOI region 1042 corresponding to a positive steering angle of interest.

In another example, the radar data processing apparatus 1010 excludes a portion of a plurality of steering angles of interest based on phase information measured from a radar signal reflected from a target point. For example, the radar data processing apparatus 1010 determines whether the target point is located on a right side or a left side with respect to the movement direction of the data processing apparatus 1010 based on a simplified phase comparison between radar data for the target point. The radar data processing apparatus 1010 selects a portion of the plurality of steering angles of interest based on a side in which the target point is located. The radar data processing apparatus 1010 determines an AOI region based on the selected portion of the steering angles of interest.

Figure 11:
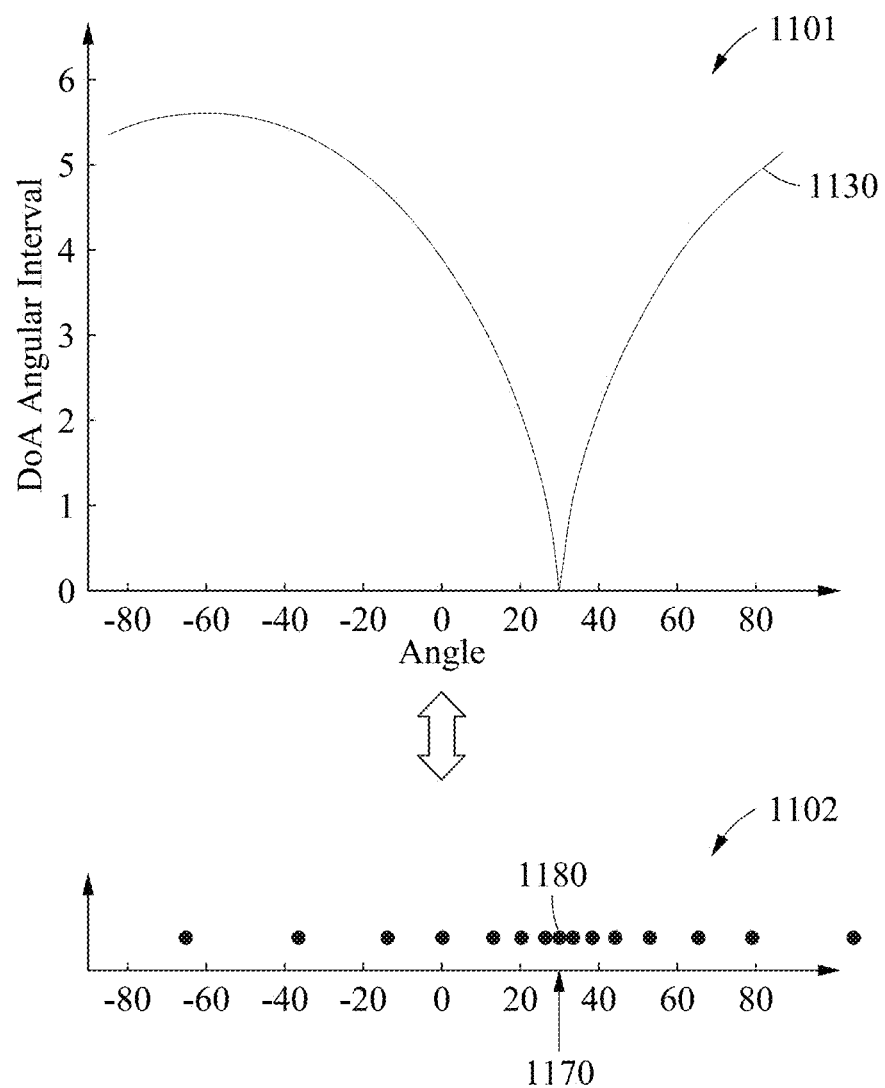
FIG. 11 illustrates an example of determining a resolution of a candidate steering vector added to an AOI region.

FIG. 11 illustrates an example of determining a resolution of a candidate steering vector added to an AOI region.

FIG. 11 is described based on the target C 923 of FIG. 9a. FIG. 11 illustrates an example of steering resolution configuration data 1101 and steering information 1102 generated based on the steering resolution configuration data 1101 when a steering angle of interest is 30 degrees.

For example, a horizontal axis and a vertical axis of the steering resolution configuration data 1101 represents an angle and an angular resolution, respectively. The steering resolution configuration data 1101 indicates an angular resolution based on a steering angle corresponding to an individual target point. Also, the angular resolution corresponds to an angular difference between candidate steering vectors 1180 within an AOI region. When the angular difference decreases, a density of the steering information 1102 increases.

A radar data processing apparatus adds a predetermined number of candidate steering vectors 1180 within the AOI region in the steering information 1102. For example, the radar data processing apparatus adds a number of candidate steering vectors 1180 calculated based on an angular resolution designated for the AOI region to the steering information 1102.

The steering information 1102 is a set of candidate steering vectors 1180 with respect to an arbitrary distance. For example, the steering information 1102 includes candidate steering vectors 1180 that are spaced apart by the angular difference corresponding to the angular resolution indicated by the steering resolution configuration data 1101. Although FIG. 11 illustrates the steering information 1102 in one dimension for convenience of description, examples are not limited thereto. The steering information 1102 also includes candidate steering vectors 1180 with different densities for each distance and for each steering angle.

The radar data processing apparatus determines a number of candidate steering vectors 1180 added based on an angular difference from an AOI 1170 within an AOI region, and an angular interval between candidate steering vectors 1180. For example, the radar data processing apparatus adds a larger number of candidate steering vectors 1180 to a region close to a central portion of the AOI region. The radar data processing apparatus adds a smaller number of candidate steering vectors 1180 to a region far away from the central portion of the AOI region. Thus, the steering information 1102 includes candidate steering vectors 1180 at a relatively high density in a region close to the AOI 1170, and includes candidate steering vectors 1180 at a relatively low density in a region far away from the AOI 1170.

For the target C, because the angle of interest is 30 degrees, the steering resolution configuration data 1101 is expressed in the same form as a resolution indicating line 1130. Thus, the radar data processing apparatus sets an angular interval to increase as a distance from an AOI increases.

Although a curved resolution indicating line is shown in FIG. 11, a form of a resolution indicating line is not limited thereto. In FIG. 11, the resolution indicating line 1130 is shown as a downwardly concave curve that is symmetric about the AOI 1170 and converges to a minimum value (for example, "0") near the AOI 1170, but examples are not limited thereto. For example, the resolution indicating line 1130 may be a downwardly convex curve that is symmetric about the AOI 1170 and converges to a minimum value (for example, "0") near the AOI 1170. Also, resolution indicating lines 1130 are two straight lines symmetrical to each other about the AOI 1170 while converging to a minimum value (for example, "0") near the AOI 1170. Although the resolution indicating lines 1130 are symmetrical to each other about the AOI 1170 as shown in FIG. 11, examples are not limited thereto.

The resolution indicating line 1130 is used to set an angular interval between candidate steering vectors included in the steering information 1102. The resolution indicating line 1130 indicates an angular interval that decreases in a region close to the AOI 1170 and an angular interval that increases in a region far away from the AOI 1170.

Thus, the radar data processing apparatus determines an angular interval between candidate steering vectors 1180 within the AOI region based on the resolution indicating line 1130.

The steering resolution configuration data 1101 includes resolution indicating lines for a plurality of targets sensed by an arbitrary radar sensor. The radar data processing apparatus determines a density of candidate steering vectors 1180 for each steering angle with respect to the radar sensor by an overlapping of a plurality of resolution indicating lines. For example, when each of the plurality of resolution indicating lines individually indicates an angular interval for an arbitrary target point, the radar data processing apparatus determines an average of angular intervals as an angular resolution for the target point.

Also, the radar data processing apparatus determines a minimum interval threshold within the AOI region. For example, the radar data processing apparatus limits an angular interval between candidate steering vectors 1180 near the AOI 1170 within the AOI region to be greater than or equal to the minimum interval threshold, despite the resolution indicating lines 1130. The minimum interval threshold is a threshold indicating a minimum angular interval between candidate steering vectors 1180. For example, when the minimum interval threshold is set to "0.7," the radar data processing apparatus adds candidate steering vectors 1180 at an interval of at least 0.7 degrees within the AOI region to the steering information 1102. Thus, the radar data processing apparatus may prevent an unnecessary operation by identifying radar data at a finer resolution than a required resolution.

The radar data processing apparatus determines a maximum interval threshold outside the AOI region. For example, the radar data processing apparatus limits an angular interval between candidate steering vectors 1180 in a region (for example, 60 degrees, 80 degrees, −60 degrees or −80 degrees) far away from the AOI 1170 (for example, 30 degrees for the target C) to be less than or equal to the maximum interval threshold, despite the resolution indicating lines 1130. The maximum interval threshold is a threshold indicating a maximum angular interval between candidate steering vectors 1180. For example, when the maximum interval threshold is set to "2.8," the radar data processing apparatus adds, to the steering information 1102, candidate steering vectors 1180 at an interval less than or equal to 2.8 degrees with respect an entire sensing range of a radar sensor. Thus, even for regions other than the AOI region, the radar data processing apparatus may ensure a user's safety by identifying radar data at a resolution corresponding to a minimum degree of precision.

Figure 12:
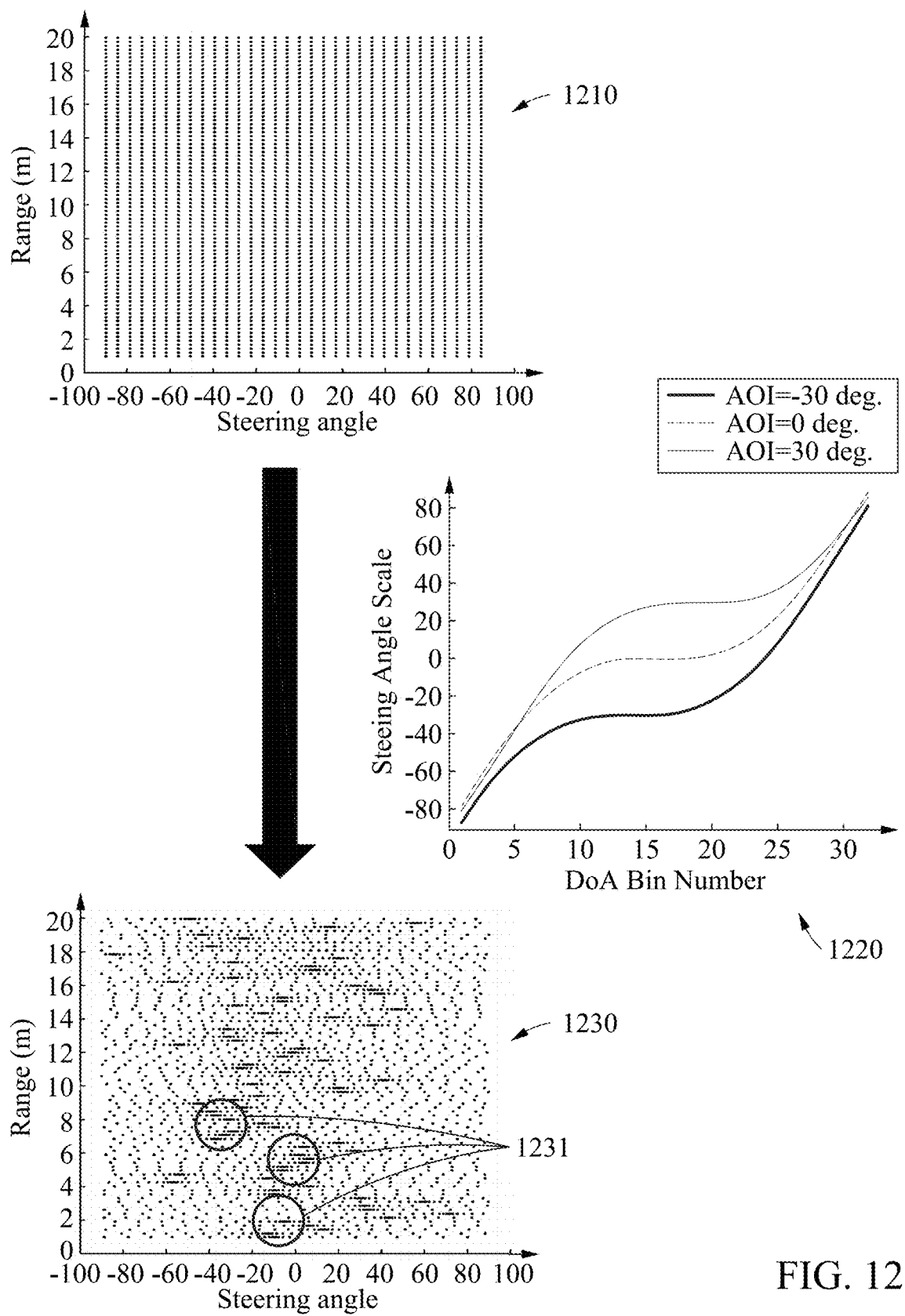
FIG. 12 illustrates an example of determined steering information.

FIG. 12 illustrates an example of determined steering information.

A radar data processing apparatus dynamically adjusts any one or any combination of a location of an AOI region, a size of an AOI region, and a number of AOI regions. The location of the AOI region is defined by a candidate steering angle and a range in steering information. The size of the AOI region is determined as a circle around an AOI, but examples are not limited thereto. The AOI region corresponds to angles around the AOI with respect to a range corresponding to a target point. The number of AOI regions corresponds to a number of target points detected from a Doppler map.

For example, the radar data processing apparatus generates adaptive steering information 1230 from default steering information 1210. The radar data processing apparatus changes a distribution of candidate steering vectors included in the default steering information 1210 based on configuration data 1220, to generate the adaptive steering information 1230. For example, the radar data processing apparatus adjusts a number of candidate steering vectors added to an AOI region. In the configuration data 1220, a horizontal axis represents a number by which an FOV of a radar sensor is divided, and a vertical axis represents a steering angle. The configuration data 1220 is merely an example, and examples are not limited thereto.

A point shown in the adaptive steering information 1230 corresponds to a candidate steering vector. For example, a point shown at an arbitrary steering angle and an arbitrary range may be a candidate steering vector including phase information of a radar signal calculated to be received at the steering angle and the range. Points of FIG. 12 indicate candidate steering vectors. In an AOI region 1231 of the adaptive steering information 1230, candidate steering vectors have a relatively high density.

The radar data processing apparatus adds a candidate steering vector to the AOI region. Also, the radar data processing apparatus eliminates at least a portion of candidate steering vectors corresponding to a region other than the predicted AOI region from steering information. Thus, the radar data processing apparatus further focuses on the AOI region. The radar data processing apparatus dynamically adjusts a resolution of a radar image based on the adaptive steering information 1230 that includes candidate steering vectors densely distributed in the AOI region and candidate steering vectors sparsely distributed in the other regions.

The radar data processing apparatus increases a radar resolution for an AOI region in which a target is expected to exist, by dynamically adjusting candidate steering vectors included in steering information.

The radar data processing apparatuses 110, 200 and 1010, the radar sensors 111 and 210, 310 and 1011, other apparatuses, units, modules, devices, and other components described herein with respect to FIGS. 1, 2, 3 and 10a are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4, 5, 7 and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A radar data processing method performed by a radar data processing apparatus, the method comprising:
   predicting an angle-of-interest (AOI) region based on a Doppler map generated from radar data;
   adjusting steering information based on the predicted AOI region, the steering information being used to identify the radar data;
   determining direction-of-arrival (DOA) information corresponding to the radar data based on the adjusted steering information; and
   recognizing a surrounding environment associated with the radar data processing apparatus, using a result of the determining.

2. The radar data processing method of claim 1, wherein the adjusting the steering information comprises adding, to the steering information, a steering vector indicating phase information calculated to be represented by radar data within the predicted AOI region.

3. The radar data processing method of claim 1, wherein the adjusting the steering information comprises eliminating at least a portion of steering vectors corresponding to a region other than the predicted AOI region from the steering information.

4. The radar data processing method of claim 1, wherein the predicting the AOI region comprises determining the AOI region based on an angle formed between a movement direction of a radar data processing apparatus that includes a radar sensor used to sense the radar data and a direction in which radar data reflected from a target point shown in the Doppler map is received.

5. The radar data processing method of claim 1, wherein the predicting the AOI region comprises determining a steering angle from a radar data processing apparatus that includes a radar sensor used to sense the radar data to a target point shown in the Doppler map, based on a velocity of the radar data processing apparatus and a Doppler velocity of the target point.

6. The radar data processing method of claim 5, wherein the determining the steering angle comprises, in response to steering angles being calculated based on the Doppler velocity of the target point and the velocity of the radar data processing apparatus, excluding one steering angle from the steering angles.

7. The radar data processing method of claim 6, wherein the excluding the steering angle from the steering angles comprises:
   selecting a steering angle within a field of view (FOV) of the radar sensor based on the FOV; and
   excluding a steering angle outside the FOV.

8. The radar data processing method of claim 7, further comprising:
   receiving a radar signal reflected from the target point using the radar sensor to view a side with respect to a movement direction of the radar data processing apparatus.

9. The radar data processing method of claim 6, wherein the excluding the steering angle from the steering angles comprises excluding one steering angle from the steering angles based on phase information measured from a radar signal reflected from the target point.

10. The radar data processing method of claim 1, wherein the adjusting the steering information comprises adding one or more steering vectors within the AOI region to the steering information.

11. The radar data processing method of claim 1, wherein the adjusting the steering information comprises adding one or more steering vectors calculated based on an angular resolution designated for the AOI region to the steering information.

12. The radar data processing method of claim 1, wherein the predicting the AOI region comprises determining the AOI region based on a distance to a target point shown in the Doppler map and an angle formed between a movement direction of a radar data processing apparatus, which includes a radar sensor that sensed the radar data, and a direction in which a signal reflected from the target point is received.

13. The radar data processing method of claim 1, wherein the predicting the AOI region comprises dynamically adjusting any one or any combination of a location and a size of the AOI region and a number of AOI regions.

14. The radar data processing method of claim 1, wherein the adjusting the steering information comprises generating a steering vector of a dimension corresponding to a number of reception (Rx) channels of a radar sensor used to sense the radar data.

15. The radar data processing method of claim 1, wherein the determining the DOA information comprises:
   searching for a steering vector matched to the sensed radar data among steering vectors included in the steering information; and
   determining a steering angle mapped to a found steering vector as DOA information corresponding to the radar data.

16. The radar data processing method of claim 1, further comprising:
   generating a radar scan image for a radar sensor used to sense the radar data based on the DOA information.

17. The radar data processing method of claim 16, further comprising:

generating a surrounding map of a radar data processing apparatus based on radar scan images generated for each of a plurality of radar sensors used to sense the radar data.

18. The radar data processing method of claim 1, wherein the predicting the AOI region comprises generating the Doppler map for a radar sensor used to sense the radar data based on a frequency difference between a signal radiated by the radar sensor and a reflected signal.

19. A non-transitory computer-readable storage medium storing instructions that, when executed by a processor, cause the processor to perform the radar data processing method of claim 1.

20. A radar data processing apparatus comprising:
   a radar sensor configured to sense radar data; and
   a processor configured to:
   predict an angle-of-interest (AOI) region based on a Doppler map generated from the radar data;
   adjust steering information based on the predicted AOI region;
   determine direction-of-arrival (DOA) information corresponding to the radar data based on the adjusted steering information, the steering information being used to identify the radar data; and
   recognize a surrounding environment associated with the radar data processing apparatus, using a result of the determining.

21. A method performed by a radar data processing apparatus, the method comprising:
   determining an angle-of-interest (AOI) region based on an angle formed between a movement direction of the radar data processing apparatus and a direction in which radar data reflected from a target point is received;
   identifying a target steering vector matched to a radar vector of the radar data from steering information and determining a steering angle corresponding to the identified target steering vector as direction-of-arrival (DOA) information;
   generating a surrounding map based on the DOA information;
   recognizing a surrounding environment associated with the radar data processing apparatus, using a result of the generating.

22. The method of claim 21, wherein the generating the surrounding map includes converting information on the target point to coordinates and updating the surrounding map based on the coordinates.

* * * * *